Nov. 20, 1923.                                                              1,475,135
                              K. OKAMOTO
                               RIM TOOL
                         Filed Sept. 30, 1922            2 Sheets-Sheet 1
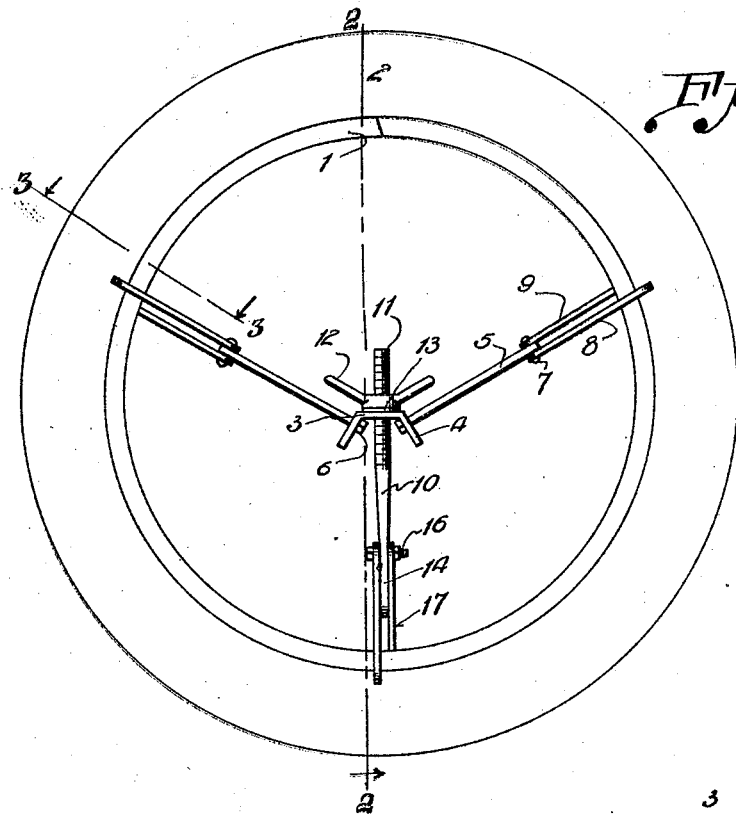
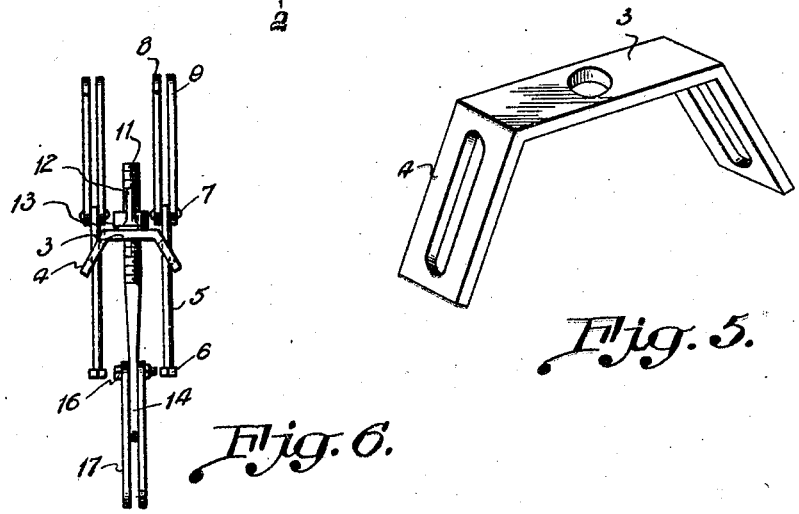
K. Okamoto
INVENTOR
BY Victor J. Evans
ATTORNEY
WITNESS:

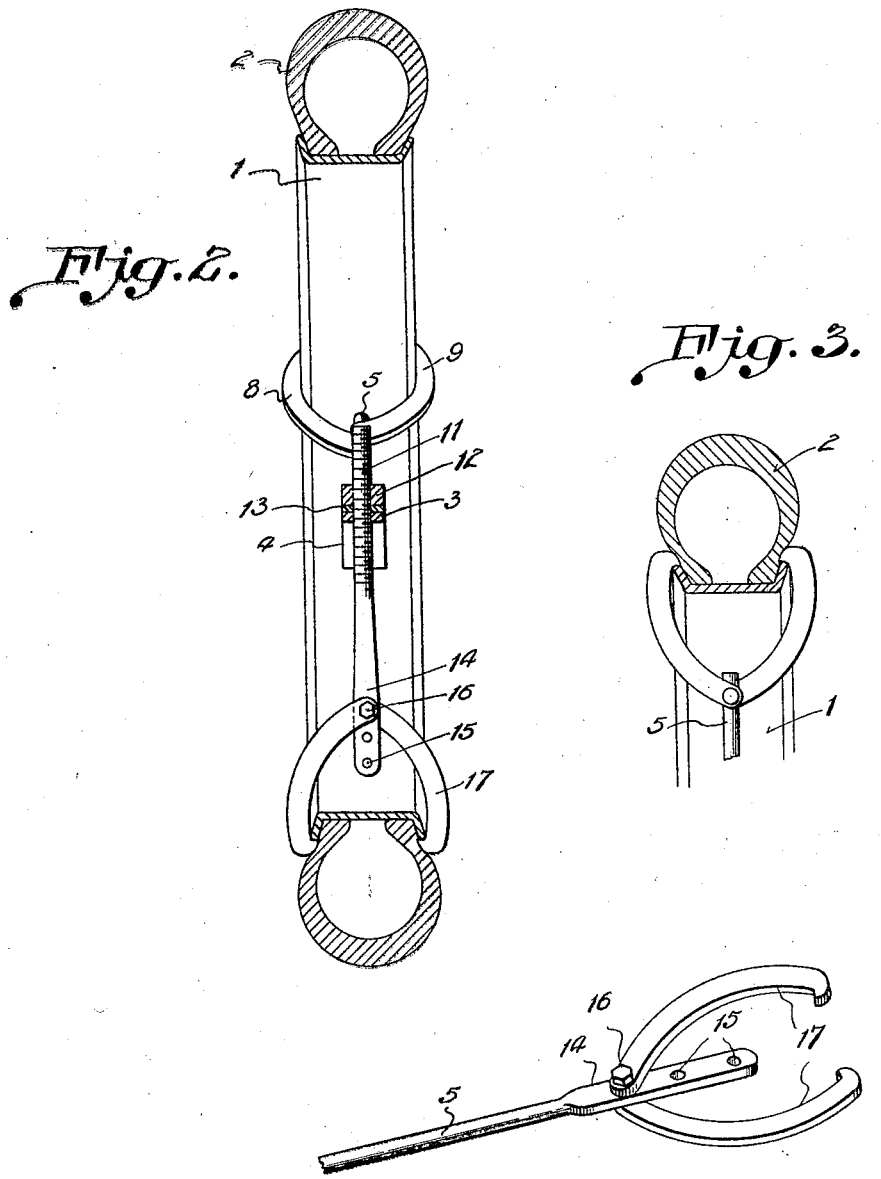

Patented Nov. 20, 1923.

1,475,135

UNITED STATES PATENT OFFICE.

KUSUHIDE OKAMOTO, OF HONOLULU, TERRITORY OF HAWAII.

RIM TOOL.

Application filed September 30, 1922. Serial No. 591,574.

*To all whom it may concern:*

Be it known that I, KUSUHIDE OKAMOTO, a citizen of Japan, residing at Honolulu, Oahu, in the Territory of Hawaii, have invented new and useful Improvements in Rim Tools, of which the following is a specification.

My present invention has reference to a rim contractor.

My primary object is to produce a device for contracting the demountable wheel rim of an automobile in an easy and expeditious manner to permit of the removal of the shoe from the rim.

A further object is to produce a rim contracting tool in which a plate having angle ends is employed and in which rods are slidably received through the plate and through the angle ends thereof, said last mentioned rods being headed, all of the rods having pivotally connected to their outer ends claw members to engage the opposed edges of the rim, while the rod that passes centrally through the plate has associated therewith adjusting means which, when actuated will cause all of the rods to be moved inwardly with respect to the rim that the claws engage so that the split rim can be thus readily contracted.

It is a still further object to produce a tool of this character which shall be adjustable to adapt itself to various sizes of wheel rims and which shall be collapsible so that the same may be folded into a small compact bundle when not required for use.

The foregoing, and other objects which will present themselves as the nature of the invention is better understood, may be accomplished by a construction, combination and operative association of parts such as is disclosed by the drawings which accompany and which form part of this application.

In the drawings:—

Figure 1 is a plan view of the improvement in operative position.

Figure 2 is a sectional view on the line 2—2 of Figure 1, upon an enlarged scale.

Figure 3 is a similar sectional view on the line 3—3 of Figure 1.

Figure 4 is a fragmentary perspective view illustrating the manner in which the claws are pivotally associated with one of the rods.

Figure 5 is a perspective view of the plate provided with the angle ends through which the rods are slidably associated.

Figure 6 is a view of the device in its collapsed or folded condition.

In the drawings, the numeral 1 designates a split rim which is to be removed from a shoe or casing 2.

Also in the drawings the numeral 3 indicates a metal plate which has its ends extended at opposite angles, the angle ends being indicated by the numeral 4. The plate is centrally provided with an opening as are the angle ends 4 thereof. Through the last mentioned openings there are passed rods 5 respectively that have their inner ends headed, as at 6. The outer ends of the rods are preferably flattened, and pivotally secured thereto as at 7 are gripping claws 8 and 9 respectively. The claws are rounded to their ends which are pivotally secured to the rods and the said claws are designed to engage the opposite edges of the rim 1. If desired, suitable spring means may be arranged between the claws 8 and 9 to force the same toward each other, the springs, however, being removably connected with one of the claws so that the said claws may be swung against the rods 5 and the rods 5 moved through the openings in the angle ends of the plate 3 when the device is collapsed.

Through the central opening in the plate 3 there passes a rod 10. The rod 10, at the portion thereof passing through the plate is rounded and threaded, as at 11, the said threaded end being engaged by a winged nut 12. Between the winged nut and the plate there is a washer 13. The opposite end of the rod is flattened, as at 14, and the said flattened end is provided with any desired number of spaced openings 15. Through one of these openings 15 there is passed a removable pivot 16 that connects to the rod 13 a pair of claw members 17 similar to the claws 8 and 9.

By reference to Figure 1 of the drawings, it is believed that the operation of the improvement will be apparent. All of the claws are brought into gripping engagement with the split rim 1. The winged nut 12 is turned which will have the effect of drawing the rod 10 through the plate 3 and which also draws upon the rods 5, thus readily contracting the rim 1 to permit of the removal of the tire or shoe 2 therefrom.

When the device is not in use it may be folded into a small compact bundle, as illustrated in Figure 6 of the drawings.

Having described the invention I claim:—

1. In a tire rim contractor, a plate having angle ends, rods slidable through the plate and through the angle ends thereof, said last mentioned rods having their inner ends headed, a pair of claws pivotally secured to the outer end of each of the rods, and the rod received centrally through the plate having means thereon for moving the same through the plate.

2. A collapsible and adjustable split rim contracting tool, comprising a plate having angle ends, rods passing through the angle ends of the plate and having their inner ends threaded, a pair of claws pivotally secured to the outer ends of the rods, a rod having a threaded end passing centrally through the plate, a winged nut on the rod, a washer between the nut and plate, said rod having its outer end flattened and provided with a plurality of spaced apertures, claw members for the end of the said rod, and a pivot passing through the claw members and one of the said apertures.

In testimony whereof I affix my signature.

KUSUHIDE OKAMOTO.